(12) United States Patent
Yoshimi et al.

(10) Patent No.: US 6,579,959 B2
(45) Date of Patent: Jun. 17, 2003

(54) PROCESS FOR PRODUCING ISOBUTYLENE POLYMERS

(75) Inventors: Chiho Yoshimi, Kako-gun (JP); Keizo Hayashi, Takasago (JP); Shigeru Hagimori, Settsu (JP); Naoki Furukawa, Himeji (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/100,167

(22) Filed: Mar. 19, 2002

(65) Prior Publication Data

US 2002/0193549 A1 Dec. 19, 2002

(30) Foreign Application Priority Data

Mar. 22, 2001 (JP) .......................... 2001-082789
Dec. 7, 2001 (JP) .......................... 2001-373633

(51) Int. Cl.$^7$ ................................ C08F 10/10
(52) U.S. Cl. ............... 526/209; 526/135; 526/147; 526/237; 526/348.7; 525/267; 525/270; 525/288; 525/313; 525/918
(58) Field of Search ............... 526/135, 147, 526/209, 237, 348.7; 525/267, 270, 288, 313, 918

(56) References Cited

U.S. PATENT DOCUMENTS 5,066,730 A * 11/1991 Kennedy et al. ..... 526/348.7 X
5,169,914 A * 12/1992 Kaszas et al. ............... 526/135
5,451,647 A * 9/1995 Faust et al. .................. 526/147
5,527,870 A    6/1996 Maeda et al.
5,721,331 A    2/1998 Shachi et al.
5,777,037 A    7/1998 Yamanaka et al.

FOREIGN PATENT DOCUMENTS

| DE | 198 25 334 A1 | 12/1999 |
| EP | 1 026 175 A1 | 8/2000 |
| JP | 11-255819 | 9/1999 |
| JP | 20001-181306 | 7/2001 |

* cited by examiner

Primary Examiner—Fred Teskin
(74) Attorney, Agent, or Firm—Foley & Lardner

(57) ABSTRACT

The present invention has for its object to produce an isobutylene polymer having excellent performance characteristics by suppressing side reactions at the polymer growth termini during polymerization. The process of the present invention is to carry out a cationic polymerization of a monomer component containing isobutylene in the presence of a polymerization initiator, a catalyst, an ether compound, and an electron donor. Moreover, the process is to carry out a cationic polymerization of a monomer component containing isobutylene in the presence of a polymerization initiator, a catalyst, an ether compound, and an electron donor, and add a compound having the carbon-carbon unsaturated bond for introducing the carbon-carbon unsaturated bond into the polymer terminus.

19 Claims, No Drawings

PROCESS FOR PRODUCING ISOBUTYLENE POLYMERS

FIELD OF THE INVENTION

The present invention relates to a production process of isobutylene polymers.

PRIOR ART

The polymerization of isobutylene is known to proceed in a manner of cationic polymerization. As a technology for conducting such a cationic polymerization, there is known the inifer process which comprises using a compound having halogens bound to tertiary carbons (e.g. 1,4-bis(α-chloroisopropyl)benzene; hereinafter abbreviated as p-DCC) as a polymerization initiator in the presence of a Lewis acid catalyst (U.S. Pat. No. 4,276,394). This technology provides for free molecular weight design through modulation of the molar ratio between an initiator and a monomer and thus allows product designs according to the application use.

The problem with the inifer process is that the initiator efficiency is decreased by side reactions such as indanylation of the initiator. To cope with this problem, methods employing electron donor or the like have been proposed (Japanese Kokai Publication Hei-02-245004, Japanese Kokai Publication Hei-01-318014, Japanese Kokai Publication Hei-03-174403, Japanese Kokai Publication Hei-08-301955).

Meanwhile, for efficient production of isobutylene polymers on a commercial scale, the technology employing a reaction solvent having a dielectric constant within a certain range and the technology which comprises purifying the used solvent and reusing it are known (Japanese Kokai Publication Hei-08-53514, Japanese Kokai Publication Hei-09-071611, Japanese Kokai Publication Hei-11-255819).

Isobutylene polymers can be converted to cured products having excellent characteristics by introducing functional groups such as vinyl groups into molecular termini and curing the polymers by means of vulcanization and crosslinking. Particularly the telechelic polymers obtainable by using a bifunctional initiator such as said p-DCC are capable of forming dense networks on curing so that cured products can be provided with high strength. However, when the functional group introduction rate is low, the number of molecules having a functional group only at one terminus is increased so that many intermolecular discontinuities are produced on curing to markedly lower the strength of the cured product.

For the introduction of functional groups into the termini of isobutylene polymers, the technology using allylsilane, 1,9-decadiene or the like is known. However, according to the prior art, the reaction for introducing functional groups into the polymer termini is inhibited by indanylation of the molecular terminus, chain transfer reaction, etc., which take place during the polymerization reaction, so that it has been difficult to obtain an isobutylene polymer with a sufficiently high functional group introduction rate.

SUMMARY OF THE INVENTION

In view of the above state of the art, the present invention has for its object to produce an isobutylene polymer having excellent performance characteristics with good efficiency on a commercial scale by suppressing side reactions at the polymer growth termini during synthesis of an isobutylene polymer.

More particularly, the object of the present invention is to produce an isobutylene polymer having a carbon-carbon unsaturated bond at a terminus thereof and adapted to express high strength on curing with good efficiency on a commercial scale through inhibition of side reactions at polymer growth termini during synthesis of the isobutylene polymer and consequent improvement in the introduction rate of the carbon-carbon unsaturated bond into the polymer terminus.

The present invention, therefore, is directed to a production process of an isobutylene polymer
which comprises carrying out a cationic polymerization of a monomer component containing isobutylene in the presence of a polymerization initiator, a catalyst, an ether compound, and an electron donor.

In a preferred embodiment, the present invention is directed to a production process of an isobutylene polymer having a carbon-carbon unsaturated bond at a terminus thereof
which comprises carrying out a cationic polymerization of a monomer component containing isobutylene in the presence of a polymerization initiator, a catalyst, an ether compound, and an electron donor, and
adding a compound having the carbon-carbon unsaturated bond for introducing the carbon-carbon unsaturated bond into the polymer terminus.

DETAILED DESCRIPTION OF THE INVENTION

The present invention is now described in detail.

In the production process according to the present invention, an isobutylene polymer is produced by carrying out a cationic polymerization of a monomer component containing isobutylene in the presence of a polymerization initiator, a catalyst, an ether compound, and an electron donor.

In the present invention, the polymerization initiator is not particularly restricted provided that it is capable of initiating a polymerization in the presence of a catalyst, but from reactivity points of view, a compound having a halogen atom bound to a tertiary carbon is preferred. The more preferred among them is a compound in which at least one of the substituents bound to the tertiary carbon is an aromatic ring. Specifically, 1,4-bis(α-chloroisopropyl)benzene (hereinafter abbreviated as p-DCC) and tricumyl chloride, etc. can be mentioned.

The amount of use of the polymerization initiator may be properly selected according to the molecular weight of the polymer to be produced. Specifically, the monomer component containing isobutylene can be used in an amount of 500 to 500,000 g relative to each mole of the polymerization initiator. To produce a polymer having a molecular weight of about 10,000, for instance, it is reasonable to use 10,000 g of the monomer component containing isobutylene for each mole of the polymerization initiator.

In the present invention, various catalysts can be used according to the combination with the polymerization initiator used but, from reactivity points of view, Lewis acid catalysts are preferred. Specifically, $TiCl_4$, $AlCl_3$, $BCl_3$, $ZnCl_2$, $SnCl_4$, ethylaluminum chloride ($C_2H_5AlCl_2$), $SnBr_4$, etc. can be mentioned. The catalyst can be used in an amount of 0.1 to 1,000 molar equivalents relative to each mole of the polymerization initiator. It can also be used in an amount of 0.0001 to 10 molar equivalents relative to each mole of the monomer component containing isobutylene.

As the ether compound in the present invention, there can be mentioned, for example, cyclic ethers such as tetrahydrofuran, trimethylene oxide, pentamethylene oxide, 1,4-dioxane, etc. and chain ethers such as diethyl ether, ethyl n-propyl ether, n-propyl ether, and so on. The ether compound not containing a cationically polymerizable carbon-carbon unsaturated bond is preferred. To maximize the effect of the invention, the ether compound is preferably an ether compound containing 2 to 20 carbon atoms, more preferably a cyclic ether containing 2 to 10 carbon atoms, still more preferably a cyclic ether containing 2 to 10 carbon atoms one oxygen atom.

The amount of use of said ether compound is preferably 0.01 to 5 moles, more preferably 0.035 to 2.3 moles, relative to each mole of the polymerization initiator, because if the amount is too small, the effect of the invention will not be expressed and if it is too large, the polymerization reaction itself will be interfered. Also, the preferred amount of use is 0.007 to 0.32 weight % relative the total amount of the reaction mixture.

Since the ether compound is added for the purpose of inhibiting side reactions at polymer growth termini, it is preferably added at a start of polymerization.

In the present invention, the monomer component containing isobutylene may be a monomer component composed exclusively of isobutylene or a monomer component containing other cationically polymerizable monomers in addition to isobutylene. In cases where the monomer component contains other monomer or monomers, isobutylene preferably accounts for not less than 50 weight %, more preferably not less than 70 weight %, still more preferably not less than 90 weight %, based on the total amount of the monomer component.

The other cationically polymerizable monomer or monomers include, for example, aliphatic olefins such as 2-butene, 2-methyl-1-butene, 3-methyl-2-butene, pentene, hexene, cyclohexene, vinylcyclohexane, 5-ethylidenenorbornene, indene, β-pinene, etc.; dienes such as cyclopentadiene, dicyclopentadiene, etc.; and styrenes such as styrene, α-methylsterene, p-chlorostyrene, and so on.

The amount of use of the monomer component containing isobutylene is not particularly restricted but in order to allow the polymerization reaction to proceed in a satisfactory manner, an amount of 1 to 50 weight % relative to the total amount of the reaction mixture is preferred.

In conducting the cationic polymerization according to the invention, a solvent is preferably used for allowing polymerization to proceed efficiently. The solvent is not particularly restricted insofar as the cationic polymerization can be conducted therein, and including, for example, aromatic hydrocarbon solvents, such as benzene, toluene, biphenyl, xylene, ethylbenzene, etc.; aliphatic hydrocarbon solvents, such as octane, heptane, hexane, pentane, butane, propane, ethylcyclohexane, etc.; and chlorinated hydrocarbon solvents such as dichloromethane, chloromethane, dichloroethane, chloropropane, chlorobutane, and so on. In consideration of the physical properties of the resulting polymer, it is preferable to use an aromatic hydrocarbon solvent or a mixed solvent composed of an aromatic hydrocarbon solvent and an aliphatic hydrocarbon solvent in a volume ratio of more than 10:0 to not more than 6:4.

In conducting the cationic polymerization according to the present invention, an electron donor is further used for suppressing side reactions. The electron donor includes, for example, pyridines, amines, amides, sulfoxides, and esters. Specifically, pyridine, 2-methylpyridine methylpyridine (abbreviated as picoline), trimethylamine, dimethylacetamide (abbreviated as DMAc), dimethyl sulfoxide, ethyl acetate, etc. can be mentioned. The amount of use of the electron donor is preferably lower than that of the catalyst. The preferred amount of use is 0.01 to 10 molar equivalents relative to each mole of the polymerization initiator.

In the cationic polymerization of isobutylene or the like, mere addition of the electron donor without addition of an ether compound cannot achieve the sufficient control over molecular weight distribution, suppression of side reactions at polymer growth termini, and improvement in the introduction rate of carbon-carbon unsaturated bonds into the polymer termini. Moreover, even if the amount of addition of the electron donor is increased, the above effects may not be achieved unless the ether compound is added.

Thus, in the cationic polymerization of isobutylene or the like, the combined use of said electron donor and ether compound is preferred since in this manner, the sufficient control over molecular weight distribution, suppression of side reactions at polymer growth termini, and improvement in the introduction rate of carbon-carbon unsaturated bonds into the polymer termini can be achieved and improvement in the strength of the cured product obtained therefrom can be expressed.

The cationic polymerization according to the present invention can be carried out by blending the above-mentioned respective components. The polymerization temperature is preferably within the range of −100 to 0° C., more preferably within the range of −80 to −30° C. At an excessively high temperature, the speed of polymerization tends to be retarded and side reactions such as the chain transfer reaction will be liable to take place. At an excessively low temperature, the solubility tends to be decreased to cause precipitation of the polymer in some cases.

In the production process according to the invention, the polymer growth termini can be deactivated in situ after completion of the polymerization reaction to give an isobutylene polymer having halogen atoms or the like at termini thereof.

Furthermore, a isobutylene polymer having a reactive functional group at a terminus can also be obtained by reacting, without deactivation of the polymer growth terminus, the polymer with a compound capable of introducing the reactive functional group. In this manner, functional polymers according to the application use can be obtained. As the functional groups, there can be mentioned, for example, vinyl, allyl, hydroxyl, allyl phenyl ether, and phenol groups.

The compound capable of introducing such a functional group can be used in an amount of not more than 100 molar equivalents relative to each mole of the isobutylene polymer.

Such compounds are not particularly restricted but preferably are compounds capable of introducing a carbon-carbon unsaturated bond into a polymer terminus by addition reaction or substitution reaction with a polymer growth terminus. Specifically, compounds having carbon-carbon unsaturated bonds, preferably compounds having vinyl groups can be mentioned. Particularly preferred are compounds having two or more carbon-carbon unsaturated bonds and silicon compounds having carbon-carbon unsaturated bonds. As compounds having two or more carbon-carbon unsaturated bonds, there can be mentioned, for example, 1,5-hexadiene, 1,7-octadiene, 1,9-decadiene, 1,11-dodecadiene, 3-methyl-1,7-octadiene, 4-methyl-1,9-decadiene, 5-methyl-1,9-decadiene, and so on. As silicon compounds having carbon-carbon unsaturated bonds, there can be mentioned allyltrimethylsilane and so on. Since carbon-carbon unsaturated bonds can be introduced into polymer termini by adding such a compound to the polymerization system, an isobutylene polymer having a carbon-carbon unsaturated bond at a terminus thereof can be produced.

The temperature at which these compounds are reacted may generally be about −100° C. to room temperature.

When, in accordance with the invention, a cationic polymerization is carried out in the presence of the ether compound and, then, a compound capable of introducing a reactive functional group into the polymer is added to the reaction system, there is obtained an isobutylene polymer with a high introduction rate of the reactive functional group. Particularly when the vinyl group is introduced into the polymer terminus, a high tensile strength can be expressed on curing because of the high introduction rate of vinyl function.

The isobutylene polymer obtainable by the present invention can be used in various applications such as coating materials, architectural sealants, and sealants for electronic components by utilizing excellent characteristics such as viscoelasticity, weather resistance, and gas barrier properties, etc.

In accordance with the present invention constituted as above, side reactions at polymer growth termini during polymerization are suppressed so that isobutylene polymers having excellent characteristics can be obtained.

EXAMPLES

The following Examples illustrate the present invention in further detail without defining the scope of the invention.

Example 1

A reaction vessel was charged with 750 mL of toluene, 250 mL of ethylcyclohexane, 532 mL (5.69 moles) of isobutylene monomer, 5.36 g (0.232 mole) of p-DCC, 0.79 g (0.0085 mole) of picoline, and 0.95 mL (0.012 mole; 0.071 weight % relative to the total weight of the reaction mixture) of tetrahydrofuran. A dry ice-ethanol bath was set around the reaction vessel and the reaction system was cooled to −70° C. under agitation. Then, 11.7 mL (0.106 mole) of $TiCl_4$ was added to the reaction vessel to initiate the reaction. After completion of the polymerization reaction, 8.47 mL (0.0534 mole) of allyltrimethylsilane was added for introduction of the functional group. After completion of this reaction, the reaction mixture was poured in a large quantity of water and washed under agitation. The organic layer was separated from the aqueous layer and the catalyst was then removed. From the organic layer, the volatile component was removed by the evaporation procedure to give a product polymer.

GPC analysis of the product polymer for molecular weight and molecular weight distribution revealed that the number average molecular weight was Mn=15198 and the distribution was Mw/Mn=1.28 (Mw: weight average molecular weight). NMR analysis revealed that the introduction rate of vinyl function into the polymer termini was Fn (vinyl)=2.24. Fn (vinyl) represents the number of moles of vinyl group relative to each mole of the polymerization initiator.

Evaluation as the Curable Composition

A pressure-resistant reaction vessel was charged with 220 g of the above polymer and the temperature was set to 90° C. Then, 28.95 μL of platinum catalyst was added, and after stirring, 6.20 mL of dimethylmethoxysilane was added for introduction of the crosslinking silyl group into the terminus.

The thus-prepared crosslinking silyl group-terminated polymer was caused to undergo condensation-crosslinking to prepare a rubbery cured testpiece (JIS No. 3 dumbbell: 5 mm wide×2 mm thick), and the cured modulus was evaluated by tensile test. The condensation-crosslinking was effected by blending 100 weight parts of a mixture (blending weight ratio 2:1) composed of the crosslinking silyl group-terminated polymer and the plasticizer Diana Process Oil PS-32 (trade name, product of Idemitsu Kosan) with 0.67 weight part of water and 2.5 weight parts of stannous octoate and allowing the mixture to cure at 50° C. for 20 hours. This rubbery cured product was subjected to tensile test to evaluate the tensile stress at 50% elongation (hereinafter abbreviated as M50). The result of the tensile test was M50=0.117 MPa.

Example 2

Except that the amount of addition of tetrahydrofuran was adjusted to 1.9 mL (0.024 mole; 0.14 weight % relative to the total weight of the reaction mixture), the procedure of Example 1 was otherwise repeated. GPC analysis of the product polymer for molecular weight and molecular weight distribution revealed that the number average molecular weight was Mn=17411 and the distribution was Mw/Mn=1.2. NMR analysis revealed that the introduction rate of vinyl function into the polymer termini was Fn(vinyl)=2.3. As found by the tensile test performed in the same manner as in Example 1, M50=0.143 MPa.

Example 3

In this example, the ether compound was added under such condition that a monomer concentration in the polymerization reaction was increased.

A reaction vessel was charged with 714 mL of toluene, 238 mL of ethylcyclohexane, 585 mL (6.26 moles) of isobutylene monomer, 5.89 g (0.255 mole) of p-DCC, 0.87 g (0.0083 mole) of picoline, and 0.95 mL (0.012 mole; 0.071 weight % relative to the total weight of the reaction mixture) of tetrahydrofuran. A dry ice-ethanol bath was set around the reaction vessel to cool the temperature to −70° C. under agitation. Then, 10.5 mL (0.096 mole) of $TiCl_4$ was added to the reaction vessel to initiate the reaction. After completion of the polymerization reaction, 10.53 mL (0.0587 mole) of allyltrimethylsilane was added for introduction of the functional group. After completion of this reaction, the reaction mixture was poured in a large quantity of water and washed under agitation. The organic layer was separated from the aqueous layer and the catalyst was then removed. From the organic layer, the volatile component was removed by the evaporation procedure to give a product polymer.

GPC analysis of the product polymer for molecular weight and molecular weight distribution revealed that the number average molecular weight was Mn=14898 and the distribution was Mw/Mn=1.20. NMR analysis revealed that the introduction rate of vinyl function into the polymer termini was Fn (vinyl)=2.27. As found by a tensile test performed in the same manner as in Example 1, M50=0.130 MPa.

As can be seen from the above Examples, addition of an ether compound on the production of an isobutylene polymer could improve the introduction rate of vinyl function into the polymer termini, whereby a polymer having a high tensile strength could be obtained.

Comparative Example 1

Except that the addition of tetrahydrofuran was omitted, the procedure of Example 1 was otherwise repeated. GPC analysis of the product polymer for molecular weight and molecular weight distribution revealed that the number average molecular weight was Mn=15060 and the distribution was Mw/Mn=1.19. NMR analysis revealed that the introduction rate of vinyl function into the polymer termini was Fn (vinyl)=1.96. The result of a tensile test was M50=0.098 MPa.

Thus, in the absence of an ether compound, no improvement was found in introduction rate of vinyl function or in the tensile strength of the cured product.

Comparative Example 2

Except that the addition of tetrahydrofuran was made at the completion of the polymerization, the procedure of Example 1 was otherwise repeated. GPC analysis of the product polymer for molecular weight and molecular weight distribution revealed that the number average molecular weight was Mn=15104 and the distribution was Mw/Mn=1.27, indicating that main chain growth reaction was significantly retarded. NMR analysis revealed that the introduction rate of vinyl function into the polymer termini was extremely low, i.e. Fn (vinyl)=1.94. The result of tensile test was M50=0.099 MPa.

Thus, when the addition of the ether compound was made at the completion of the polymerization, no improvement was obtained in the introduction rate of vinyl function or in product quality.

Comparative Example 3

Except that the addition of tetrahydrofuran was omitted, the procedure of Example 3 was otherwise repeated. analysis of the product polymer for molecular weight and molecular weight distribution revealed that the number average molecular weight was Mn=15663 and the distribution was Mw/Mn=1.33. NMR analysis revealed that the introduction rate of vinyl function into the polymer termini was Fn (vinyl)=2.08. The result of the tensile test was M50=0.109 MPa.

Thus, in the absence of an ether compound, no improvement was found in the introduction rate of vinyl function or in the tensile strength.

Comparative Example 4

Except that the addition of picoline was omitted, the procedure of Example 3 was otherwise repeated. GPC analysis of the product polymer for molecular weight and molecular weight distribution revealed that the number average molecular weight was Mn=15085 and the distribution was Mw/Mn=3.21. NMR analysis revealed that the introduction rate of vinyl function into the polymer termini was Fn (vinyl)=1.68. Thus, the molecular weight distribution was very broad and the introduction rate of vinyl function into the polymer termini was also very low.

In the absence of the electron donor picoline, the polymer growth reaction was hardly controlled and the introduction rate of vinyl function was rather suppressed.

Comparative Example 5

Except that the addition of tetrahydrofuran was omitted and the amount of picoline was increased to 2.14 g (0.023 mole), the procedure of Example 3 was otherwise repeated. GPC analysis of the product polymer for molecular weight and molecular weight distribution revealed that the number average molecular weight was Mn=14435 and the distribution was Mw/Mn=1.38. NMR analysis revealed that the introduction rate of vinyl function into the polymer termini was Fn (vinyl)=2.09. Thus, the molecular weight distribution was very broad and the main chain growth reaction was also retarded.

The introduction rate of vinyl function was not improved when the amount of addition of the electron donor picoline was simply increased without combined use of an ether compound.

The above results are summarized in Table 1, together with the results of an evaluation based on vinyl introduction rate as indicated ○, Δ or X.

TABLE 1

|  |  | Mn | Mw/Mn | Fn (vinyl) | M50 [Mpa] | Evaluation |
|---|---|---|---|---|---|---|
| Ex. | 1 | 15,198 | 1.28 | 2.24 | 0.117 | ○ |
|  | 2 | 17,411 | 1.20 | 2.30 | 0.143 | ○ |
|  | 3 | 14,898 | 1.20 | 2.27 | 0.130 | ○ |
| Compar. Ex. | 1 | 15,060 | 1.19 | 1.96 | 0.098 | Δ |
|  | 2 | 15,104 | 1.27 | 1.94 | 0.099 | Δ |
|  | 3 | 15,663 | 1.33 | 2.08 | 0.109 | Δ |
|  | 4 | 15,085 | 3.21 | 1.68 | — | X |
|  | 5 | 14,435 | 1.38 | 2.09 | — | Δ |

What is claimed is:

1. A production process of an isobutylene polymer comprising carrying out a cationic polymerization of a monomer component containing isobutylene in the presence of a polymerization initiator, a catalyst, an ether compound, and an electron donor, wherein the ether compound is a cyclic ether containing 2 to 10 carbon atoms.

2. A production process of an isobutylene polymer having a carbon-carbon unsaturated bond at a terminus thereof comprising carrying out a cationic polymerization of a monomer component containing isobutylene in the presence of a polymerization initiator, a catalyst, an ether compound, and an electron donor, and adding a compound having the carbon-carbon unsaturated bond for introducing the carbon-carbon unsaturated bond into the polymer terminus, wherein the ether compound is a cyclic ether containing 2 to 10 carbon atoms.

3. The production process according to claim 1 wherein the polymerization initiator is a compound having a halogen bound to a tertiary carbon.

4. The production process according to claim 2 wherein the compound having the carbon-carbon unsaturated bond is a compound having two or more carbon-carbon unsaturated bonds or a silicon compound having a carbon-carbon unsaturated bond.

5. The production process according to claim 1 wherein the ether compound is tetrahydrofuran.

6. The production process according to claim 1 wherein the ether compound is used in an amount of 0.035 to 2.3 moles relative to each mole of the polymerization initiator.

7. The production process according to claim 1 wherein the ether compound is used in an amount of 0.007 to 0.32 weight % relative to the total amount of a reaction mixture.

8. The production process according to claim 1 wherein the ether compound is added at a start of polymerization.

9. The production process according to claim 1 wherein the monomer component containing isobutylene is used in an amount of 1 to 50 weight % relative to the total amount of the reaction mixture.

10. The production process according to claim 1 wherein the cationic polymerization is carried out in the presence of an aromatic hydrocarbon solvent or a mixed solvent composed of an aromatic hydrocarbon solvent and an aliphatic hydrocarbon solvent in a volume ratio of more than 10:0 to not more than 6:4.

11. The production process according to claim 1 wherein the cationic polymerization is carried out within a temperature range of −100° C. to 0° C.

12. The production process according to claim 2 wherein the polymerization initiator is a compound having a halogen bound to a tertiary carbon.

13. The production process according to claim 2 wherein the ether compound is tetrahydrofuran.

14. The production process according to claim 2 wherein the ether compound is used in an amount of 0.035 to 2.3 moles relative to each mole of the polymerization initiator.

15. The production process according to claim 2 wherein the ether compound is used in an amount of 0.007 to 0.32 weight % relative to the total amount of a reaction mixture.

16. The production process according to claim 2 wherein the ether compound is added at a start of polymerization.

17. The production process according to claim 2 wherein the monomer component containing isobutylene is used in an amount of 1 to 50 weight % relative to the total amount of the reaction mixture.

18. The production process according to claim 2 wherein the cationic polymerization is carried out in the presence of an aromatic hydrocarbon solvent or a mixed solvent composed of an aromatic hydrocarbon solvent and an aliphatic hydrocarbon solvent in a volume ratio of more than 10:0 to not more than 6:4.

19. The production process according to claim 2 wherein the cationic polymerization is carried out within a temperature range of −100° C. to 0° C.

* * * * *